TRIGGER CIRCUIT

Filed Oct. 25, 1963

INVENTOR.
ALFREDO S. SHENG
BY John V. Regan
Attorney

United States Patent Office 3,274,399

Patented Sept. 20, 1966

3,274,399
TRIGGER CIRCUIT

Alfredo S. Sheng, Cherry Hill, N.J., assignor to Radio Corporation of America, a corporation of Delaware Filed Oct. 25, 1963, Ser. No. 318,940
6 Claims. (Cl. 307—88.5)

This invention relates to trigger circuits and, in particular, to a monostable trigger circuit capable of producing output pulses of very short and carefully controlled duration at high repetition rates.

A common type of prior art monostable circuit comprises a pair of regeneratively coupled amplifying devices, transistors for example, one of which conducts only when the circuit is in the stable state and the other of which conducts only when the circuit is in the unstable state. The output electrode of a first one of the devices is A.C. coupled to the control electrode of the second device by means of a capacitor. When the circuit is triggered, current for charging (or discharging) the capacitor flows through a bias resistor of substantial value connected between the control electrode of the second device and a point of fixed operating potential. The voltage developed across the bias resistor by the charge current controls the state of conduction of the second amplifying device and determines the duration of the output pulse.

The duration of the output pulse may be varied over a range of values by varying the value of either the bias resistor or the capacitor to vary the RC time constant of the combination. In a transistor multivibrator, the bias resistor represents a transient load on the first transistor. The value of this resistor must be sufficiently high to prevent too great an overdrive of the second transistor and resulting excessive base charge therein. Also, the capacitor must be large enough to sweep out the base charge from the second transistor. For these and other reasons, difficulty has been experienced in generating output pulses of less than approximately one microsecond duration in such a circuit. Further, the high value of the resistance in the discharge path of the capacitor results in a long circuit recovery time, whereby the repetition rate of the circuit suffers.

In one form of the circuit of the type described, the emitter-base junction of the second transistor becomes highly reverse-biased when the circuit is triggered. The reverse bias is such that some of the faster transistors having low base charge cannot be used because of the danger that such transistors may break down. At the same time, it is desirable when generating pulses of very short duration that the transistor have a low base charge in order that the base charge not affect the tolerance of the pulse duration. Also, as is known, transistors generally do not turn fully on instantaneously, but rather turn on gradually as the forward base bias is varied over a small range of values. Consequently, the transistor turn on and turn off times may be a substantial part of the total pulse width when pulses of short duration are generated.

It is one object of the present invention to provide an improved monostable circuit which is capable of generating output pulses of very short duration, and which has a fast recovery time.

It is another object of this invention to provide an improved monostable circuit in which the RC time constant is not dependent upon the base bias resistor.

It is still another object of this invention to provide a monostable circuit in which the output pulse width or duration is substantially immune to changes in transistor parameters.

It is a further object of this invention to provide an improved monostable circuit for generating output pulses having sharp edges.

A monostable circuit according to the invention includes a pair of amplifying devices, transistors for example, in which the output of the first transistor is coupled to the control electrode of the second transistor by means of the series combination of a capacitor and a resistor. A tunnel diode is connected across the input of the second transistor and is quiescently biased in the forward direction in a high voltage condition to maintain the second transistor conducting in the steady state. When a trigger pulse is applied to the circuit to change the state of conduction of the first transistor, current through the tunnel diode reverses direction and charges (or discharges) the capacitor through the low back resistance of the tunnel diode. Feedback from the output of the second transistor to the input of the first transistor keeps the first transistor in the switched condition until the current through the tunnel diode again reverses and the forward current reaches a value to switch the tunnel diode to the high voltage state and turn on the second transistor.

Figure 1:
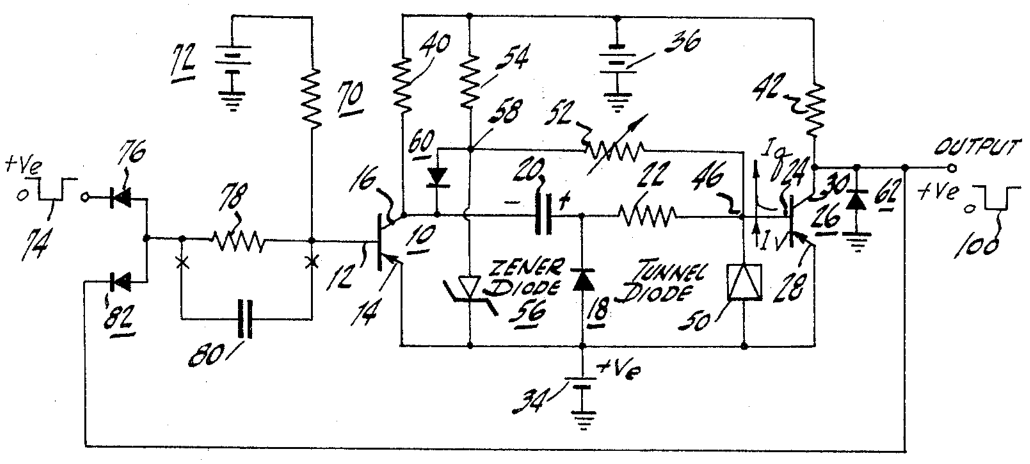
FIGURE 1 is a schematic diagram of the improved monostable circuit.

The FIGURE 1 circuit includes a first transistor 10, illustrated as a PNP type transistor, having base 12, emitter 14 and collector 16 electrodes. The series combination of a capacitor 20 and a resistor 22 is connected between the collector electrode 16 and the base 24 of a second PNP type transistor 26, and a discharge diode 18 is connected between the emitters 14, 28 and the junction of the capacitor 20 and resistor 22. Transistors 10 and 26 are biased for normal transistor operation by connecting their emitter electrodes 14, 28, respectively, to the positive terminal of a battery 34, and by connecting their collector electrodes 16, 30 respectively, to the negative terminal of a battery 36 by way of collector supply resistors 40, 42, respectively. The positive terminal of battery 36 and the negative terminal of battery 34 are returned to a point of reference potential, indicated by the conventional symbol for circuit ground.

A negative resistance diode, preferably a tunnel diode 50, is connected between the base 24 and emitter 28 electrodes of the second transistor 26. When the device is a tunnel diode, the cathode thereof is connected to the base 24 and the anode is connected to the emitter 28, whereby the tunnel diode may bias the second transistor into conduction when the tunnel diode is operated in the high voltage, forward region (to be described). Current for so biasing the tunnel diode is supplied through a variable bias resistor 52, which is connected to a point 58 on a voltage divider. The value of resistor 52 is high relative to the low resistance of the tunnel diode, and the constant voltage at point 58 is selected relative to the voltage at the tunnel diode 50 anode so that a substantially constant current flows through resistor 52.

The voltage divider comprises a resistor 54 and a constant voltage device 56 connected between the negative terminal of the battery 36 and the positive terminal of the battery 34. The constant voltage device 56 may be a Zener diode connected to be suitably reverse-biased by the batteries 34, 36. A Zener diode, as is known, has a substantially constant voltage across its terminals when reverse-biased by a source of voltage sufficient to bias the diode in its Zener voltage region. A conventional diode 60 is connected between the collector 16 of the first transistor 10 and the constant voltage point 58 for clamping the collector 16 voltage when first transistor 10 is nonconducting. A similar clamp diode 62 is connected between the collector 30 of the second transistor 26 and ground potential, and serves a like function for the second transistor.

The input circuit of the first transistor 10 comprises a base bias resistor 70 connected between the base electrode 12 and the positive terminal of a battery 72. The negative terminal of battery 72 is grounded. Trigger input signals 74 for overcoming the bias from battery 72 and driving first transistor 10 into conduction are applied through a diode 76 and a resistor 78 to the base 12 of the first transistor. A capacitor 80 may be shunted across the input resistor 78, if desired, (if used it is connected as indicated between the points *x*—*x*) to reduce the input pulse width requirements. A second input to the first transistor 10 is applied by way of a diode 82 connected in a feedback loop from the collector 30 of the second transistor 26 to the junction between input diode 76 and resistor 78.

Figure 2:
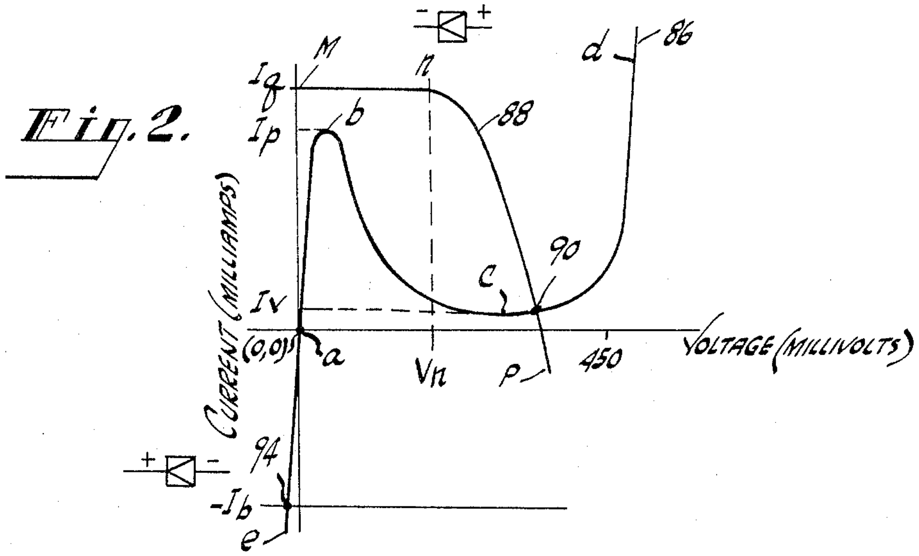
FIGURE 2 is a volt-ampere characteristic of a tunnel diode useful in describing the operation of the improved circuit.

Operation of the FIGURE 1 circuit may best be understood by first describing some of the tunnel diode characteristics and biasing. In FIGURE 2, the solid curve 86 is a volt-ampere characteristic of a typical tunnel diode. Tunnel diode 50 has a reverse conduction characteristic *ae* (third quadrant) and a forward conduction characteristic *abcd* (first quadrant). As may be seen in FIGURE 2, current through the tunnel diode, in the reverse direction, may be varied over wide limits at substantially constant voltage. The point 94 in region *ae* may correspond, for example, to about 5–10 millivolts. As is known, a tunnel diode has a very low resistance, in the order of a few ohms, when biased in the reverse direction.

The forward conduction characteristic of the tunnel diode has a first portion *ab* of positive resistance at relatively low voltage, a second region *cd* of positive resistance at high voltage, relatively speaking, and a region *bc* of negative resistance joining the two positive resistance regions. The solid curved line 88 is the quiescent load line seen by the tunnel diode 50 and comprises a first portion *mn* of substantially constant current, representing the current through resistor 52, and a second portion *np* which is the base input characteristic of the second transistor 26. Second transistor 26 is substantially nonconducting until the voltage between base 24 and emitter 28 exceeds a value $V_n$ corresponding to the point *n* on the load line 88.

In the FIGURE 1 circuit, the constant voltage at voltage divider point 58, relative to the battery 34 voltage, and the value of the variable resistor 52 are selected so that a substantially constant current $I_q$ is supplied at the junction 46 of the tunnel diode 50 and base electrode 24. The current $I_q$ is selected to be greater than the peak current $I_p$ of the tunnel diode, corresponding to the peak *b* on the V–I characteristic 86 (FIGURE 2). Accordingly, the tunnel diode is quiescently biased in the high voltage region *cd*.

The load line 88 intersects the tunnel diode characteristic 86 at a point 90 in the region *cd*. This is the quiescent operating point for the tunnel diode. A forward current approximately equal to $I_v$ flows through the tunnel diode in the quiescent state and the remaining input current $I_q - I_v$ represents the quiescent base current for the second transistor 26. The tunnel diode preferably is chosen with respect to the transistor 26 characteristic so that a current $I_p - I_v$ alone is sufficient to saturate the transistor 26. The additional current supplied through resistor 52 merely overdrives the transistor 26. The output voltage at collector 30 then is approximately $+V_e$ volts, in the quiescent condition, and this voltage is fed back to the diode 82 at the input of the first transistor 10.

The second input to the first transistor 10 normally is $+V_e$ volts, applied at the cathode of input diode 76. Due to the voltage drop across base resistor 78, the normal base 12 voltage is positive relative to the emitter 14 voltage, and first transistor 10 is quiescently nonconducting. Its output voltage, at collector 16, is clamped substantially at the value of constant voltage appearing at point 58 of the voltage divider, and the quiescent charge on capacitor 20 has the polarity indicated.

The circuit is triggered by applying a negative going pulse 74 at the cathode of input diode 76 to lower the base 12 voltage sufficiently to drive first transistor 10 into conduction. The voltage at collector 16 then rises to approximately $+V_e$ volts and a positive current step is coupled through the capacitor 20 to the junction 46 at the base of the second transistor 26. This current step causes the current through the tunnel diode 50 to reverse direction and discharge the capacitor 20 through resistor 22. When the first transistor 10 switches to the conducting condition the tunnel diode 20 may be initially switched to the operating point 94 (FIGURE 2). Initially, the current $I_q$ also is diverted through resistor 22 to aid in discharging the capacitor 20.

Second transistor 26 is turned off in response to the pulse coupled by capacitor 20 to the base electrode 24. Before second transistor 26 can turn off, however, it is necessary that the charge stored in its base region be swept out. For this reason, capacitor 20 should be large enough to remove this base charge rapidly. The output voltage at collector 30 falls close to ground potential when second transistor 26 turns off. This voltage is fed back to the input of first transistor 10 and maintains first transistor 10 conducting in the event the input pulse 74 terminates. The tunnel diode 50, as mentioned previously, has a very low resistance when biased in by reverse direction. Consequently, the tunnel diode 50 provides a very low impedance path for discharging the capacitor 20. By selecting the value of the resistor 22 to be much larger than the resistance of the tunnel diode and the saturation resistance of the second transistor 26, the RC time constant of the charge circuit may be made substantially independent of the tunnel diode and transistor 26 characteristics.

The reverse current flowing through the tunnel diode 50 decreases steadily in magnitude as the capacitor 20 discharges, and the tunnel diode operating point moves up from point 94 on the characteristic 86 (FIGURE 2) toward the point *a*. The diode 50 current reverses direction when the point *a* is reached, and a forward current then flows through the diode 50. This current increases in value as the operating point moves along the portion *ab* of the characteristic 86 as the capacitor 20 continues to discharge. Once the peak *b* is reached, the tunnel diode 50 switches rapidly through its negative resistance region to the point 90 in the high voltage region.

The discharge current flowing through resistor 22 has a value approximately equal to $I_q$ minus the tunnel diode current when the diode is forward biased in the region *ab*. At the instant of switching, therefore, the discharge current is about $I_q - I_p$. Since the tunnel diode current is approximately $I_v$ after switching, an initial current $I_p - I_v$ is available as base current for second transistor 26. As previously mentioned, the tunnel diode is selected so that a current $I_p - I_v$ is sufficient to saturate the transistor. This means that full base current for saturation is supplied to second transistor 26 when the tunnel diode switches, whereby the transistor 26 turns on rapidly with reduced delay, and the output pulse 100 has a sharp lagging edge.

Once the output voltage at collector 30 rises to approximately $+V_e$ volts, the feedback voltage turns off the first transistor 10 if the input pulse 74 has terminated. Capacitor 20 then charges rapidly through the low impedance of diode 18, whereby the circuit has a fast recovery time. On the other hand, if input pulse 74 is still present, first transistor 10 remains conducting and capacitor 20 continues to be discharged by a current $\leqq I_q - I_q$ until the capacitor 20 is either fully discharged or the input pulse 74 is terminated. In either event, the second transistor 26 is saturated. It is thus seen that the maximum duration of the input pulse is not critical.

The duration of the output pulse 100 is determined primarily by two factors: (1) The RC time constant as determined by the values of capacitor 20 and resistor 22, and (2) the normal quiescent current $I_q$ which flows through the variable resistor 52. The RC time constant determines how rapidly the operating point moves up on the portion *eb* of the operating characteristic 86 as the capacitor discharges. The quiescent current $I_q$ determines the time at which the tunnel diode switches, in the following manner. Consider that the discharge current for the capacitor 20 has a value $I_c$, which is made up of the current flowing through resistor 52 and the current through the tunnel diode 50. When the first transistor 10 initially turns on, this discharge current $I_c$ is the sum of the resistor 52 current and the reverse current flowing through the tunnel diode 50. However, when the current through the tunnel diode 50 changes from the reverse direction to the forward direction, a portion of the resistor 52 current is supplied to the tunnel diode and the difference between $I_q$ and the diode 50 current represents the discharge current $I_c$.

Tunnel diode 50 switches to the high voltage state when the peak current $I_p$ is exceeded. This occurs when the discharge current becomes less than $I_q - I_p$, and is then determined by the value of $I_q$. It is thus seen that the current $I_q$, supplied through resistor 52 determines the point in the discharge cycle at which the tunnel diode switches to the high voltage state and turns on second transistor 26. Accordingly, it may be seen that the duration of the output pulse 100 may be varied by varying the value of resistor 52. The value of this resistor 52 may be varied over wide limits. The maximum permissible value of resistor 52 is determined by $I_p$, since $I_q$ must not be less than $I_p$.

Some of the advantages of the improved circuit over the prior art circuit will now be considered. The main structural difference over the common type of prior art circuit mentioned hereinbefore is that the circuit described herein has the tunnel diode 50 and the resistor 22. In the improved circuit, the reverse voltage across the base 24-emitter 28 junction is held to a small value when the circuit is triggered, as may be seen in FIGURE 2. In the prior art circuit, however, a large current may flow through the base resistor 52 when the circuit is triggered and a very large reverse voltage, relatively speaking, appears across the base 24-emitter 28 junction. Many of the faster transistors, those having a low base charge such as the mesa transistor, cannot be used in such a circuit because the transistor breaks down under this high reverse bias condition. Those transistors which can be used in the prior art type circuit generally have a high base charge. However, high base charge affects the tolerance of the pulse width. Also, the minimum size of the capacitor 20 which can practically be used is largely determined by the base charge in the second transistor 26. Transistors with higher base charge require a higher value of capacitor 20 and a correspondingly longer RC time constant. Furthermore, a higher base charge transistor has a longer turn-on and turn-off time and produces output pulses having longer rise and fall times than a low base charge transistor.

A second advantage of the improved circuit is that the tunnel diode provides a very low impedance discharge path for the capacitor 20. Absent the tunnel diode 50 and the resistor 22, the RC time constant is determined by capacitor 20 and resistor 52. Resistor 52 generally must have a much higher value than the value of resistor 22 in order to prevent too hard a turn-on overdrive of second transistor 26, during transient conditions, and resulting excessive base charge. Consequently, pulses of much narrower duration may be generated by the improved circuit.

A third advantage of the improved circuit is that output pulses may be generated which have sharp edges. Generally speaking, a transistor does not have a sharp threshold of conduction, i.e. a transistor is not in saturation for one value of base voltage and nonconducting for all base voltages which are more positive than that value. Instead, the conduction characteristic is like that illustrated by the portion *np* of the load line 88 in FIGURE 2. The transistor begins to conduct when the voltage between base and emitter is $V_n$ volts and conduction increases with further increase in bias voltage until saturation is reached. In the absence of the tunnel diode, therefore, the output transistor 26 turns on gradually as the discharge current decreases, after the turn on voltage is reached.

In the improved circuit, however, the second transistor 26 turns on very rapidly because of the action of the tunnel diode 50. As mentioned previously, the tunnel diode is selected so that $I_p - I_v$ is sufficient to saturate the transistor 26. Therefore, full base drive is supplied when the tunnel diode switches, and the diode switches very rapidly. A sharp lagging edge on the output pulse 100 is important when very narrow pulses are being generated, since otherwise the current build-up time in the transistor 26 may be a substantial portion of the entire pulse duration.

In a typical operating circuit, the component values may be as follows when it is desired to generate output pulses having a duration of 7.4μ seconds.

| | Resistors: |
|---|---|
| Transistor **10**—2*n*965. | |
| Transistor **26**—2*n*965. | **22**—750 ohms. |
| Battery **34**—6.5 volts. | **40**—1K ohms. |
| Battery **36**—19.5 volts. | **42**—1.8K ohms. |
| Battery **72**—13 volts. | **52**—825 to 1825. |
| Zener diode **56** voltage—5.1 volts. | **54**—2K ohms. **70**—9.1K ohms. |
| Capacitor **20**—0.01 μf. | **78**—2.4K ohms. |

Output pulses having other widths or durations may be generated by varying the values of capacitor 20 and resistor 52. Pulses having a duration of less than 100 nanoseconds have been generated using the improved circuit.

What is claimed is:

1. The combination comprising:

first and second transistors of the same conductivity type each having a base, an emitter and a collector;

a capacitor and a resistor serially connected, in the order named, between the collector of the first transistor and the base of the second transistor;

a unidirectional conducting device connected between a point of reference potential and the junction of said capacitor and said resistor;

a negative resistance diode having a volt-ampere characteristic defined by a first region of positive resistance at relatively low voltage, a second positive resistance region at relatively high voltage, and a region of negative resistance joining the two positive resistance regions;

means connecting said negative resistance diode between the base and emitter of said second transistor in a direction to forward bias the emitter-base junction of the second transistor when the negative resistance diode is biased in the second positive resistance region;

bias means connected to said negative resistance diode for quiescently basing said negative resistance diode in the second region of positive resistance;

feedback means connected between the collector of the second transistor and the base of the first transistor;

bias means connected between the base and emitter of the first transistor for normally reverse-biasing the emitter-base junction of the first transistor; and means for applying a signal between the base and emitter of the first transistor to drive said first transistor into conduction.

2. The combination comprising:
first and second transistors each having a collector, a base and an emitter;
means for applying operating potentials between the collector and emitter of each of the transistors;
a capacitor and a resistor serially connected, in the order named, between the collector of the first transistor and the base of the second transistor;
a tunnel diode connected between the base and emitter of the second transistor;
bias means connected to said tunnel diode;
feedback means connected between the collector of the second transistor and the base of the first transistor; and
signal input means connected to the base of the first transistor.

3. The combination comprising:
a first amplifying device and a second amplifying device each having control, output and common electrodes;
means for applying operating potentials between the output and common electrodes of each said amplifying device;
a capacitor and an element of resistance serially connected between the output electrode of the first amplifying device and the control electrode of the second amplifying device;
a negative resistance diode connected between the control and common electrodes of said second amplifying device;
bias means connected at the control electrode of said second amplifying device;
feedback means connected between the output electrode of the second amplifying device and the control electrode of the first amplifying device; and
means for applying an input signal at the control electrode of said first amplifying device.

4. The combination comprising:
a first amplifying device and a second amplifying device each having output, control and common electrodes;
means for applying operating potentials between the output and common electrodes of each said amplifying device;
a capacitor and a resistor serially connected between the output electrode of the first amplifying device and the control electrode of the second amplifying device;
a tunnel diode connected between the control electrode and the common electrode of the second amplifying device;
bias means connected to supply a current to said tunnel diode;
feedback means connected between the output electrode of the second amplifying device and the control electrode of the first amplifying device; and
means for applying an input signal to one of said control electrodes.

5. The combination comprising:
first and second transistors each having a collector, a base and an emitter;
means for applying operating potentials between the collector and emitter of each of the transistors;
a capacitor and a resistor serially connected, in the order named, between the collector of the first transistor and the base of the second transistor;
a tunnel diode connected between the base and emitter of the second transistor, said tunnel diode having a first region of positive resistance at relatively low voltage, a second positive resistance region at relatively high voltage, and a region of negative resistance joining the two regions of positive resistance;
said tunnel diode being connected between the base and emitter of said second transistor in a direction to forward bias the emitter-base junction of the second transistor when the tunnel diode is biased in the second region of positive resistance;
means for supplying current to said tunnel diode of a value to bias said tunnel diode quiescently in the second region of positive resistance;
feedback means connected between the collector of the second transistor and the base of the first transistor; and
means for applying input signals between the base and emitter of the first transistor.

6. The combination comprising:
first and second transistors each having a collector, a base and an emitter;
means for applying operating potentials between the collector and emitter of each of the transistors;
a capacitor and a resistor serially connected, in the order named, between the collector of the first transistor and the base of the second transistor;
a tunnel diode connected between the base and emitter of the second transistor, said tunnel diode having a first region of positive resistance at relatively low voltage, a second positive resistance region at relatively high voltage, and a region of negative resistance joining the two regions of positive resistance;
said tunnel diode being connected between the base and emitter of said second transistor in a direction to forward bias the emitter-base junction of the second transistor when the tunnel diode is biased in the second region of positive resistance;
means for supplying current to said tunnel diode of a value to bias said tunnel diode quiescently in the second region of positive resistance;
a unidirectional conducting device connected between the junction of said capacitor and resistor and a point of constant potential;
feedback means connected between the collector of the second transistor and the base of the first transistor; and
means for applying input signals between the base and emitter of the first transistor.

No references cited.

ARTHUR GAUSS, *Primary Examiner.*

R. H. EPSTEIN, *Assistant Examiner.*